(12) United States Patent   (10) Patent No.: US 9,096,286 B1
Lin   (45) Date of Patent: Aug. 4, 2015

(54) SADDLE REAR RACK FOR BICYCLE

(71) Applicant: Po-Chien Lin, Taichung (TW)

(72) Inventor: Po-Chien Lin, Taichung (TW)

( * ) Notice: Subject to any disclaimer, the term of this patent is extended or adjusted under 35 U.S.C. 154(b) by 0 days.

(21) Appl. No.: 14/289,640

(22) Filed: May 28, 2014

(30) Foreign Application Priority Data

Jan. 14, 2014 (TW) .............................. 103200745 U

(51) Int. Cl.
B62J 9/00 (2006.01)
(52) U.S. Cl.
CPC ...................................... B62J 9/006 (2013.01)
(58) Field of Classification Search
CPC ....................................................... B62J 9/006
USPC ......... 224/427, 428, 440, 443, 448, 449, 450, 224/457, 553, 558, 560
See application file for complete search history.

(56) References Cited

U.S. PATENT DOCUMENTS

| | | | | |
|---|---|---|---|---|
| 1,995,656 A | * | 3/1935 | Stout | 248/292.12 |
| 3,784,149 A | * | 1/1974 | Brudy | 248/478 |
| 5,168,601 A | * | 12/1992 | Liu | 16/445 |
| 5,190,345 A | * | 3/1993 | Lin | 297/188.12 |
| 6,988,701 B1 | * | 1/2006 | Lin | 248/521 |
| 7,225,956 B2 | * | 6/2007 | Lien et al. | 224/427 |
| 8,284,549 B2 | * | 10/2012 | Liu | 361/679.23 |
| 2007/0119888 A1 | * | 5/2007 | Chuang | 224/427 |
| 2008/0251555 A1 | * | 10/2008 | Andrews | 224/427 |
| 2010/0006720 A1 | * | 1/2010 | Chien-Ping | 248/201 |
| 2010/0264184 A1 | * | 10/2010 | Retief | 224/427 |
| 2012/0014744 A1 | * | 1/2012 | Lin | 403/91 |
| 2012/0168479 A1 | * | 7/2012 | Mc Kenzie | 224/427 |

FOREIGN PATENT DOCUMENTS

WO   WO-2010/111829 A1 * 10/2010 .............. B65J 9/006

* cited by examiner

Primary Examiner — Gary Elkins

(57) ABSTRACT

A saddle rear rack for a bicycle contains a body, a connector, and two coupling sets. The body is in a frame shape and includes an accommodating cavity, two tabs, and two polygonal recesses. The connector is fixed between the two tabs and includes two hanging bars for hanging the connector on two stems of a bottom end of a saddle, and the connector also includes two toothed notches. Each coupling set includes a fixing element, a limiting element, and a screw bolt. The fixing element a polygonal surrounding section for corresponding to each polygonal recess and a toothed surrounding section for inserting into and engaging with each toothed notch. The limiting element has a circular disc and a circular peg corresponding to the toothed surrounding section of the fixing element, and the screw bolt is screwed with and unscrewed from the fixing element and the limiting element.

4 Claims, 7 Drawing Sheets

SADDLE REAR RACK FOR BICYCLE

FIELD OF THE INVENTION

The present invention relates to a saddle rear rack for a bicycle which is hanged on two stems of a bottom end of a saddle and is rotated toward a desired angle based on using requirement easily and quickly.

BACKGROUND OF THE INVENTION

A conventional saddle rear rack for a bicycle is disclosed in TW Patent No. M364045 and contains a hollow frame, at least two fixing holes defined on a bottom rim of a main plate, and at least two $CO^2$ bottles for supplying gas to bicycle wheel(s). A feeding end of each $CO^2$ bottle corresponds to each fixing hole so that each $CO^2$ bottle closes a bottom end of the hollow frame, and an accommodating cavity is defined between the at least two $CO^2$ bottles and the hollow frame to accommodate repair tools. The conventional saddle rear rack also contains a tab disposed on the hollow frame and employed to fix the hollow frame on a stem of a saddle, thus accommodating the repair tools in a front triangular mount of the bicycle.

Furthermore, the hollow frame has two symmetrical side sheets, the main plate coupled with the two side sheets, two slots formed on two edges of the two side sheets, two opposite clamping pieces connecting with the two slots, and two orifices defined on the two clamping pieces. The tab is fixed between the two clamping pieces and has an aperture so that a screwing shaft is screwed with a nut through the two orifices and the aperture.

However, the hollow frame is fixed on the tab by means of the nut, and no any adjusting structure is defined between the hollow frame and the tab, so the object(s) are accommodated in the hollow frame after removing the hollow frame by using a screwdriver, thereby cause operational inconvenience.

The present invention has arisen to mitigate and/or obviate the afore-described disadvantages.

SUMMARY OF THE INVENTION

The primary objective of the present invention is to provide a saddle rear rack for a bicycle which is hanged on two stems of a bottom end of a saddle and is rotated toward a desired angle based on using requirement easily and quickly.

To obtain the above objectives, a saddle rear rack for a bicycle provided by the present invention contains: a body, a connector, and two coupling sets.

The body is twisted in a frame shape and includes an accommodating cavity for accommodating object(s), two tabs symmetrically arranged on two sides thereof, and two polygonal recesses symmetrically defined in the two tabs.

The connector is fixed between the two tabs and includes two hanging bars for hanging the connector on two stems of a bottom end of a saddle, and the connector also includes two toothed notches formed on two sides thereof.

Each coupling set includes a fixing element, a limiting element, and a screw bolt; the fixing element is inserted into each polygonal recess and has a polygonal surrounding section for corresponding to each polygonal recess and has a toothed surrounding section for inserting into and engaging with each toothed notch; the limiting element is secured into each toothed notch of the connector and has a circular disc, a diameter of which is larger than each toothed notch; the limiting element also has a circular peg, a diameter of which is smaller than each toothed notch; the circular peg of the limiting element corresponds to the toothed surrounding section of the fixing element, and the screw bolt is screwed with and unscrewed from the fixing element and the limiting element.

Thereby, the toothed surrounding section of the fixing element engages with each toothed notch of the connector to position the body relative to the connector, such that as desiring to rotate the body toward a desired angle based on using requirement, each coupling set is pulled so that the toothed surrounding section disengages from each toothed notch, and the circular peg of the limiting element is released from the toothed surrounding section to rotate the body toward the desired angle. Thereafter, the toothed surrounding section of each coupling set is engaged with each toothed notch of the connector to position the body again.

Preferably, the connector further includes a guiding groove arranged therein to slide the two hanging bars and includes a slot formed along the guiding groove. The connector further includes two screwing elements for screwing with and unscrewing from the two hanging bars via the slot. Thereby, two fixing positions of the two hanging bars on the connector are adjusted by screwing and unscrewing the two screwing elements.

The body further includes an affixing rib arranged around an inner rim of a bottom end thereof so that the object(s) is hanged on the body by matching with a storage box.

The body further includes two locking trenches defined on the two sides thereof and screwing with two screws to fix the object(s) or the storage box in the accommodating cavity.

Accordingly, the saddle rear rack of the present invention is hanged on the two stems of the bottom end of the saddle so that a rider hangs keys, pocket purse, phones or repair tools. In addition, the body is rotated toward the desired angle based on the using requirement easily and quickly.

DETAILED DESCRIPTION OF THE PREFERRED EMBODIMENTS

Figure 1:
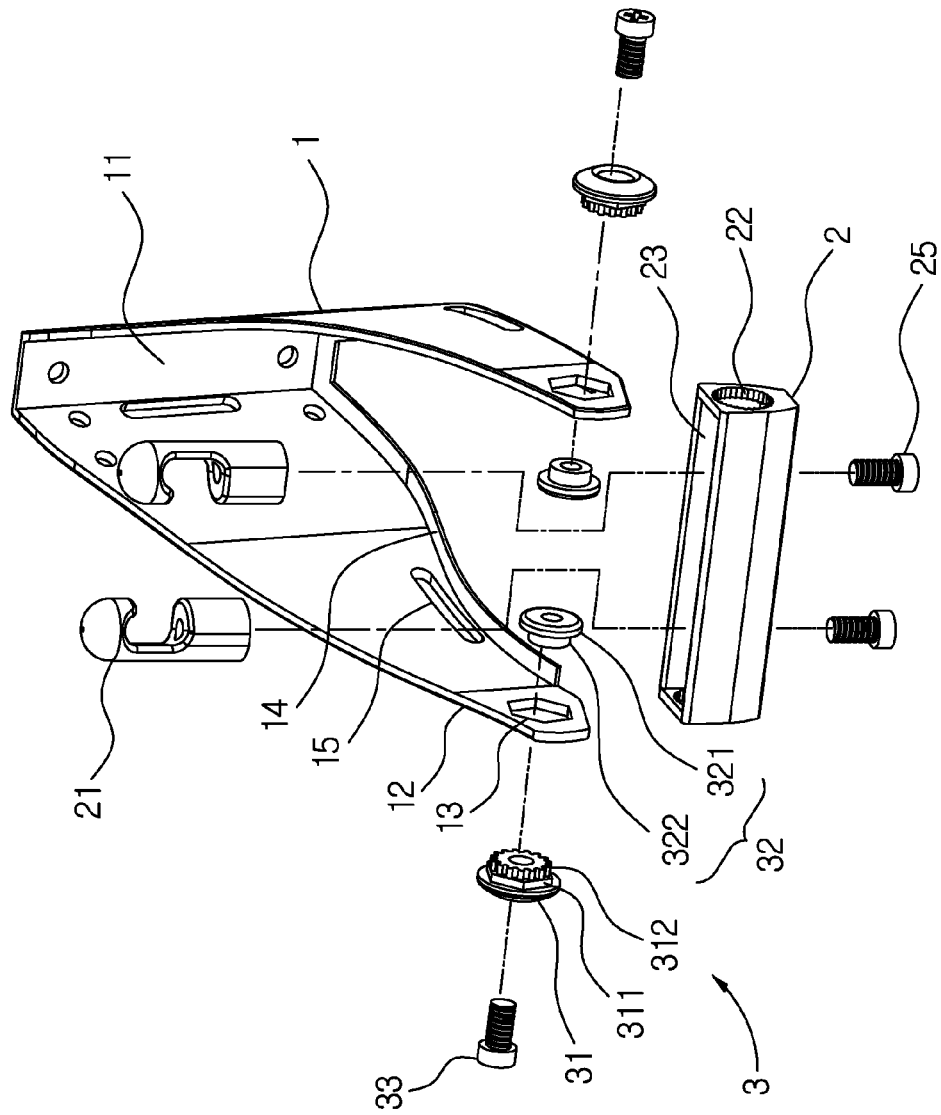
FIG. 1 is a perspective view showing the exploded components of a saddle rear rack for a bicycle according to a preferred embodiment of the present invention.
Figure 2:
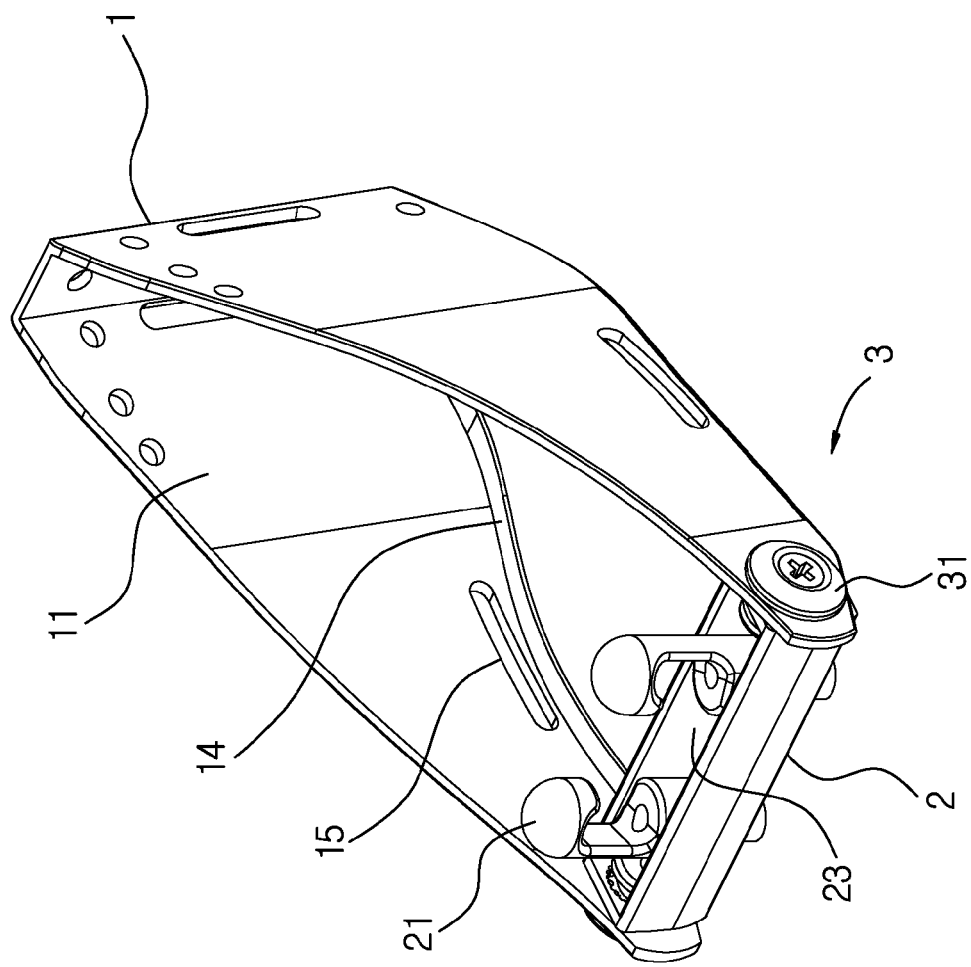
FIG. 2 is a perspective view showing the assembly of the saddle rear rack for the bicycle according to the preferred embodiment of the present invention.

With reference to FIGS. 1-7, a saddle rear rack for a bicycle according to a preferred embodiment of the present invention is mounted on a bottom end of a bicycle saddle and comprises: a body 1, a connector 2, and two coupling sets 3.

The body 1 is twisted in a frame shape from a plastic material or a carbon fiber material and includes an accommodating cavity 11 for accommodating object(s), two tabs 12 symmetrically arranged on two sides thereof, and two polygonal recesses 13 symmetrically defined in the two tabs 12.

The connector 2 is fixed between the two tabs 12 and includes two hanging bars 21 for hanging the connector 2 on two stems 41 of a bottom end of a saddle 4 (the two stems 41 are joined with a seat post of the bicycle so as to adjust a first angle of the saddle 4 relative to the seat post). The connector 2 also includes two toothed notches 22 formed on two sides thereof.

Each coupling set 3 includes a fixing element 31, a limiting element 32, and a screw bolt 33. The fixing element 31 is inserted into each polygonal recess 13 and has a polygonal surrounding section 311 for corresponding to each polygonal recess 13 and has a toothed surrounding section 312 for inserting into and engaging with each toothed notch 22. The limiting element 32 is secured into each toothed notch 22 of the connector 2 and has a circular disc 321, a diameter of which is larger than each toothed notch 22. The limiting element 32 also has a circular peg 322, a diameter of which is smaller than each toothed notch 22. The circular peg 322 of the limiting element 32 corresponds to the toothed surrounding section 312 of the fixing element 31, and the screw bolt 33 is screwed with and unscrewed from the fixing element 31 and the limiting element 32.

Figure 3:
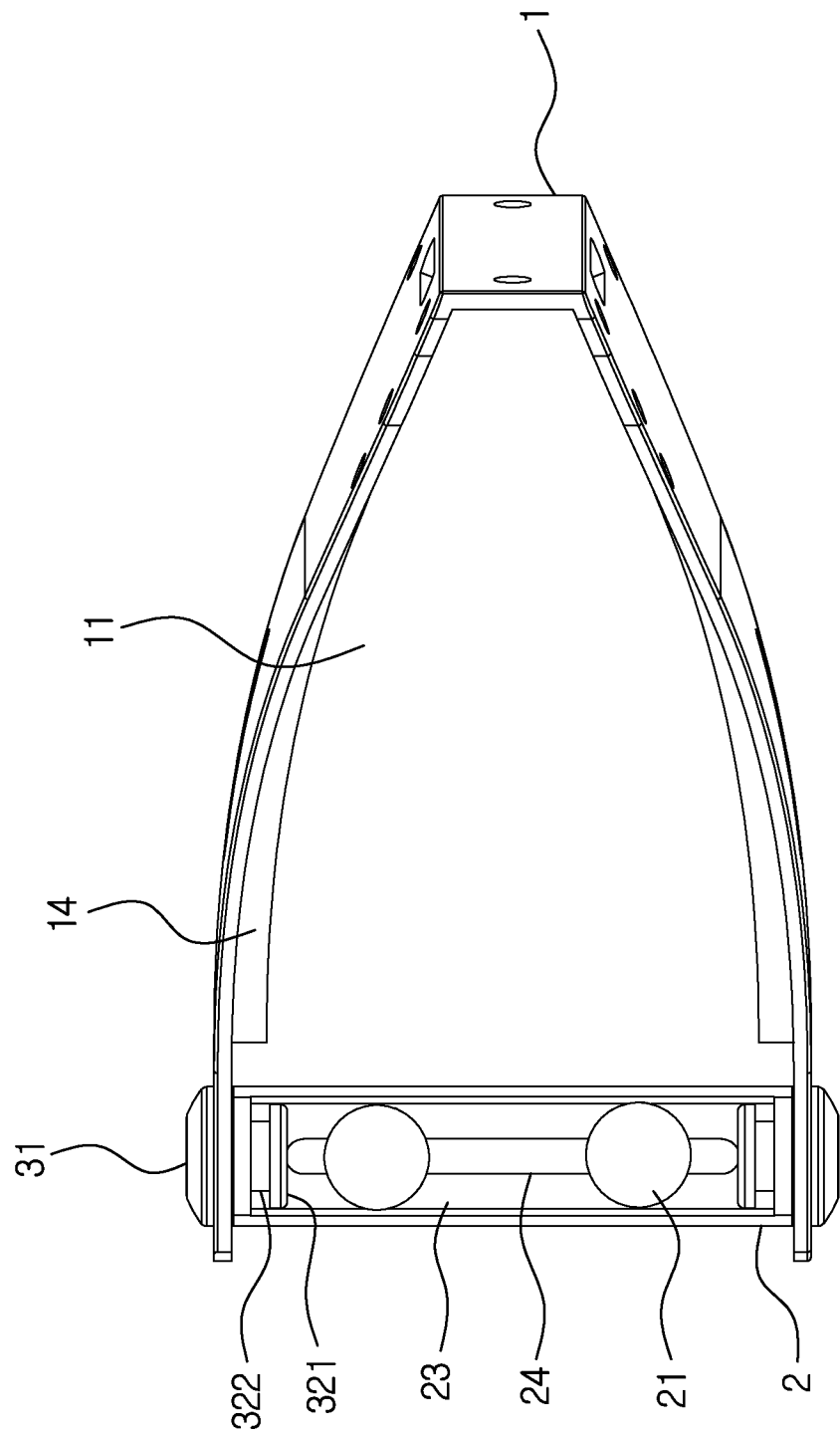
FIG. 3 is a top plan view showing the assembly of the saddle rear rack for the bicycle according to the preferred embodiment of the present invention.
Figure 4:
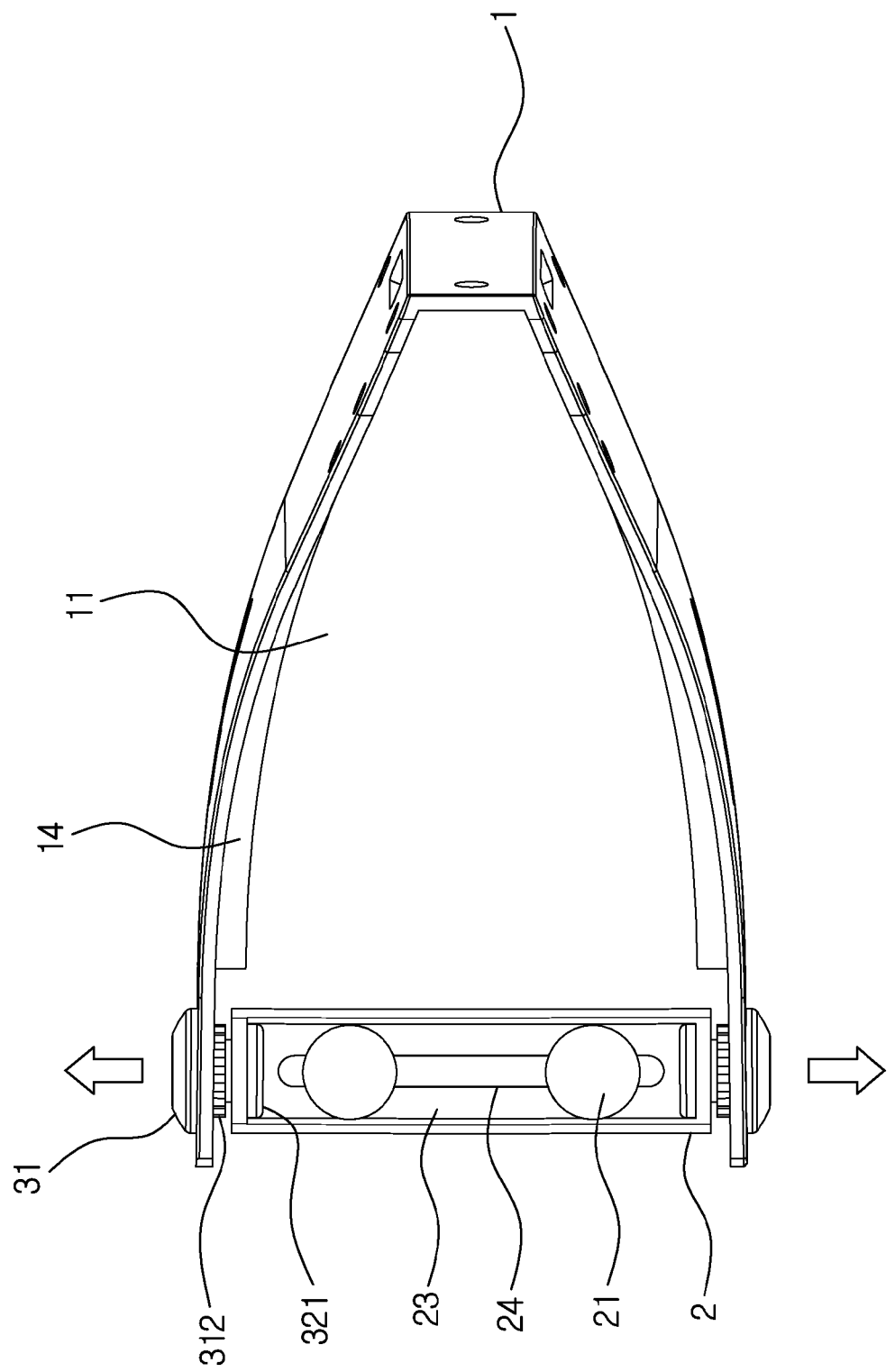
FIG. 4 is a top plan view showing the operation of the saddle rear rack for the bicycle according to the preferred embodiment of the present invention.
Figure 5:
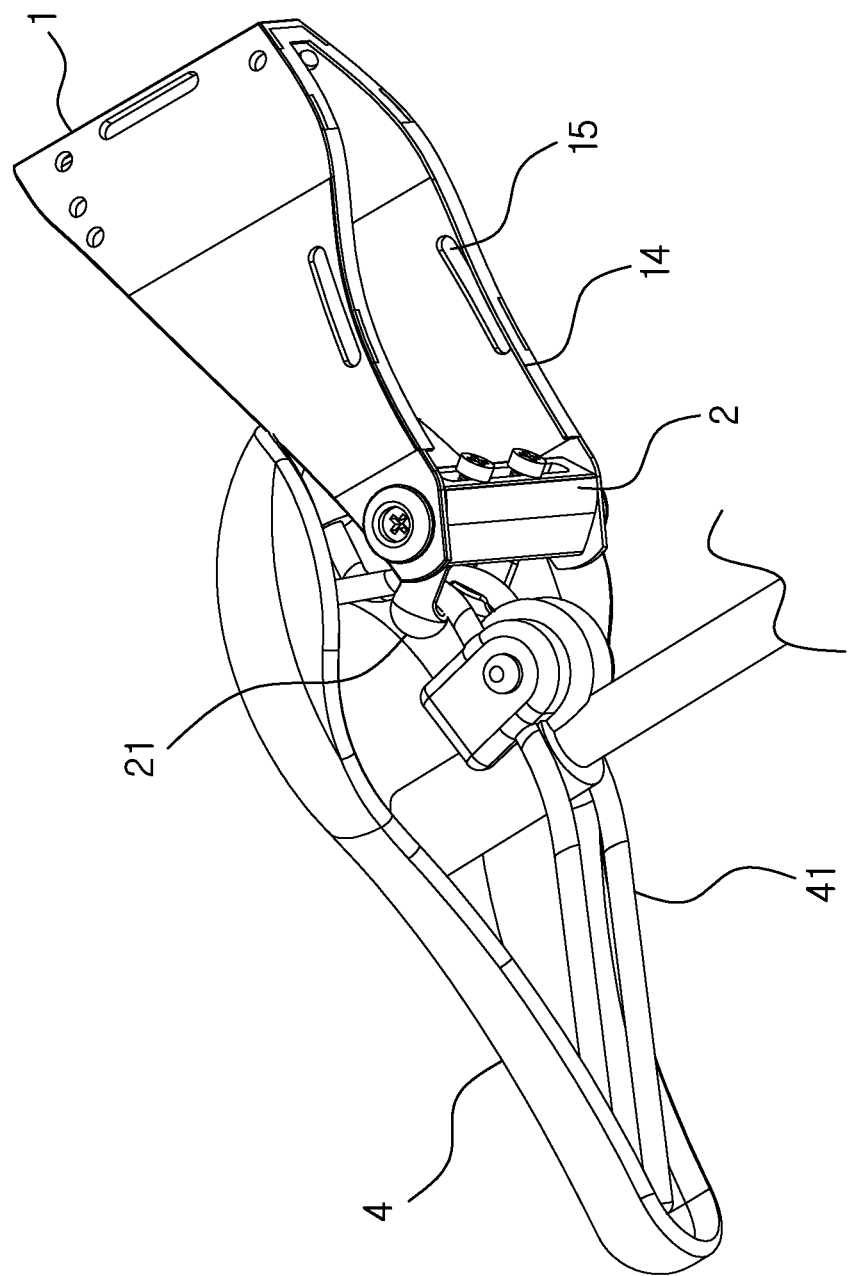
FIG. 5 is a perspective view of a saddle of a bicycle according to the preferred embodiment of the present invention.
Figure 6:
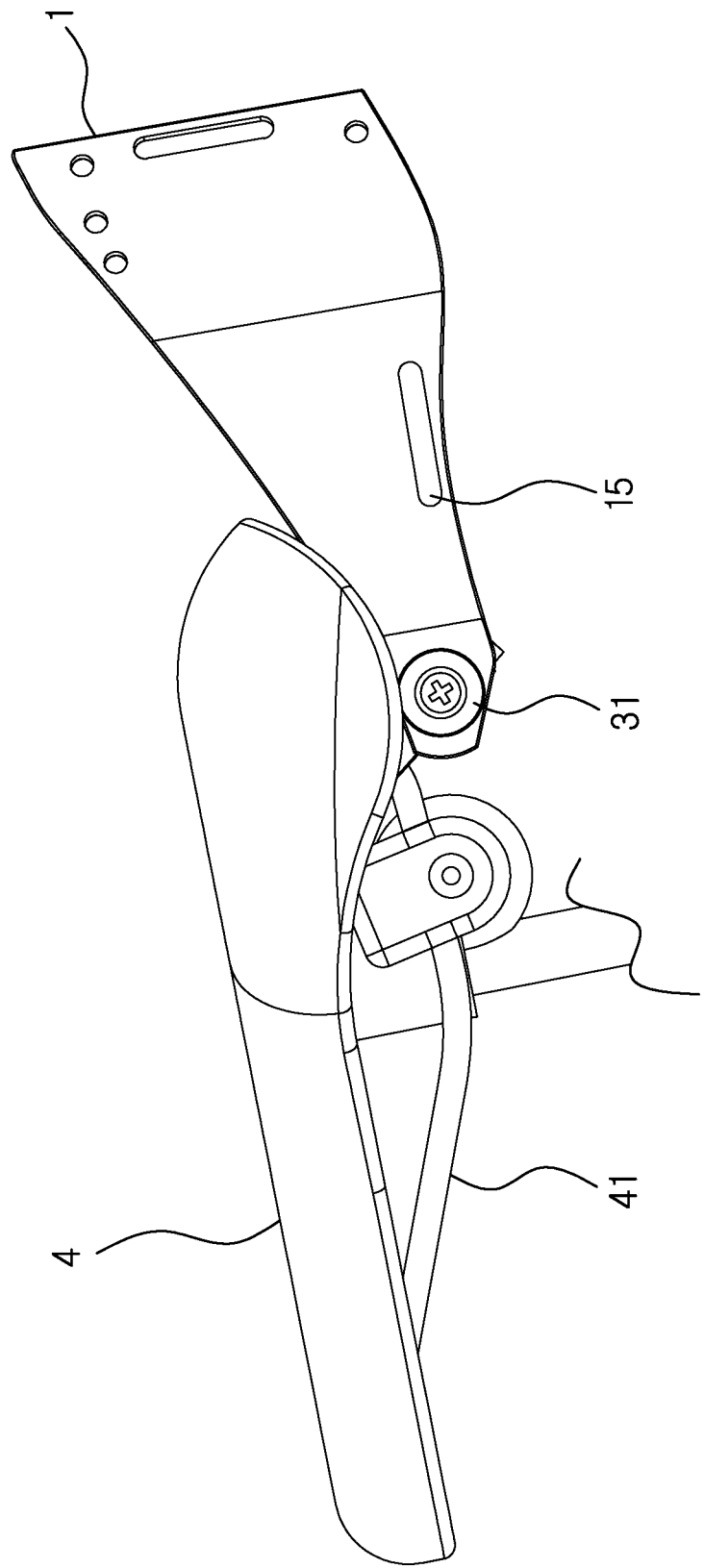
FIG. 6 is a side plan view showing the assembly of the saddle rear rack for the bicycle according to the preferred embodiment of the present invention.
Figure 7:
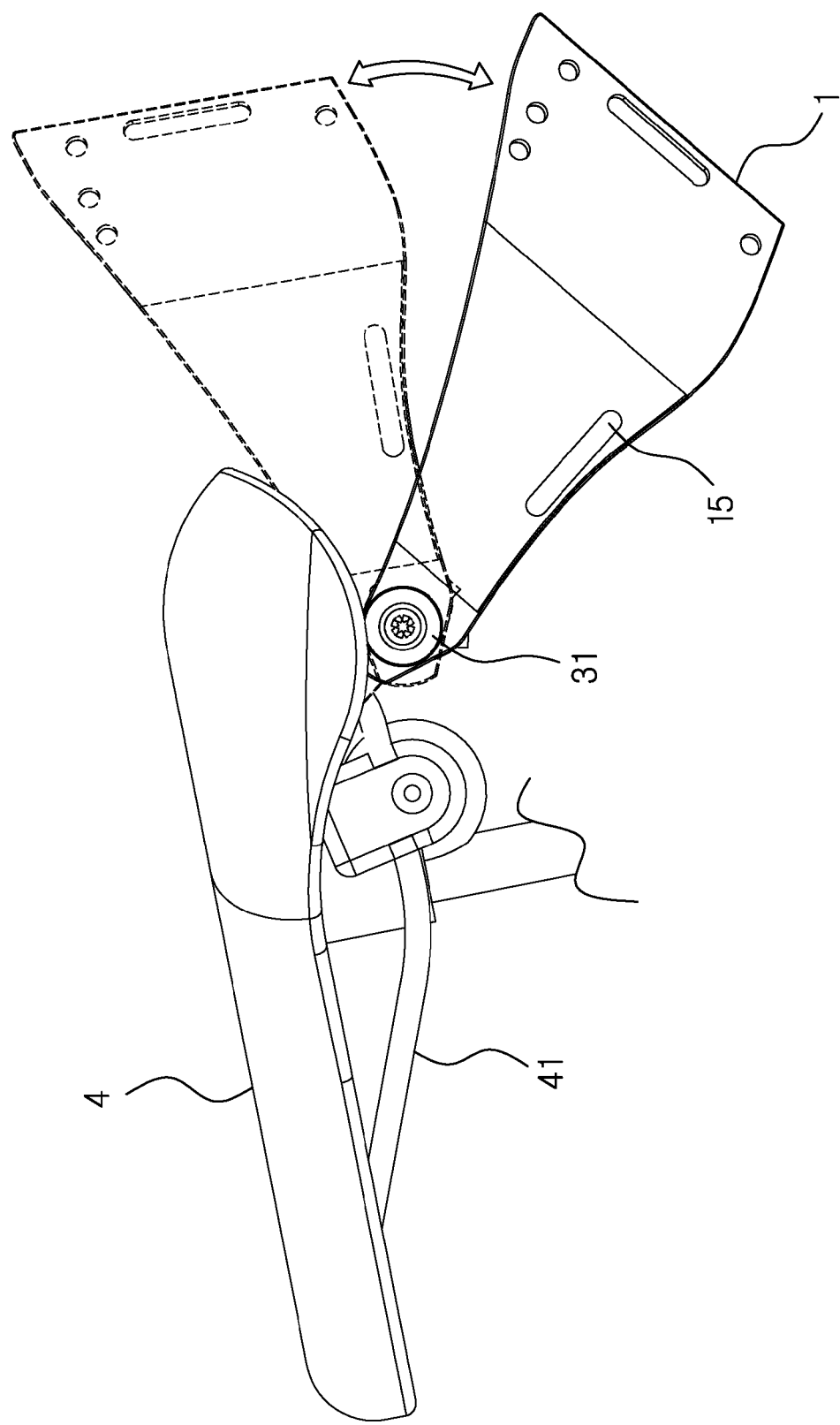
FIG. 7 is a side plan view showing the operation of the saddle rear rack for the bicycle according to the preferred embodiment of the present invention.

Thereby, the toothed surrounding section 312 of the fixing element 31 engages with each toothed notch 22 of the connector 2 to position the body 1 at a second angle relative to the connector 2 (as shown in FIGS. 3 and 6), such that as desiring to rotate the body 1 toward a third angle based on using requirement, each coupling set 3 is pulled so that the toothed surrounding section 312 disengages from each toothed notch 22, and the circular peg 322 of the limiting element 32 is released from the toothed surrounding section 312 to rotate the body 1 toward the third angle. Thereafter, the toothed surrounding section 312 of each coupling set 3 is engaged with each toothed notch 22 of the connector 2 to position the body 1 again.

Preferably, the connector 2 further includes a guiding groove 23 arranged therein to slide the two hanging bars 21 and includes a slot 24 formed along the guiding groove 23. The connector 2 further includes two screwing elements 25 for screwing with and unscrewing from the two hanging bars 21 via the slot 24. Thereby, two fixing positions of the two hanging bars 21 on the connector 2 are adjusted by screwing and unscrewing the two screwing elements 25.

The body 1 further includes an affixing rib 14 arranged around an inner rim of a bottom end thereof so that the object(s) is hanged on the body 1 by matching with a storage box (the storage box corresponds to a profile of the accommodating cavity 11, and since it is a well-known prior art, further remarks are omitted hereafter).

The body 1 further includes two locking trenches 15 defined on the two sides thereof and screwing with two screws to fix the object(s) or the storage box in the accommodating cavity 11.

Accordingly, the saddle rear rack of the present invention is hanged on the two stems 41 of the bottom end of the saddle 4 so that a rider hangs keys, pocket purse, phones or repair tools. In addition, the body 1 is rotated toward the third angle based on the using requirement easily and quickly.

While the preferred embodiments of the invention have been set forth for the purpose of disclosure, modifications of the disclosed embodiments of the invention and other embodiments thereof may occur to those skilled in the art. Accordingly, the appended claims are intended to cover all embodiments which do not depart from the spirit and scope of the invention.

What is claimed is:

1. A saddle rear rack for a bicycle comprising: a body, a connector, and two coupling sets; wherein
   the body is twisted in a frame shape and includes an accommodating cavity for accommodating object(s), two tabs symmetrically arranged on two sides thereof, and two polygonal recesses symmetrically defined in the two tabs;
   the connector is fixed between the two tabs and includes two hanging bars for hanging the connector on two stems of a bottom end of a saddle, and the connector also includes two toothed notches formed on two sides thereof;
   each coupling set includes a fixing element, a limiting element, and a screw bolt; the fixing element is inserted into each polygonal recess and has a polygonal surrounding section for corresponding to each polygonal recess and has a toothed surrounding section for inserting into and engaging with each toothed notch; the limiting element is secured into each toothed notch of the connector and has a circular disc, a diameter of which is larger than each toothed notch; the limiting element also has a circular peg, a diameter of which is smaller than each toothed notch; the circular peg of the limiting element corresponds to the toothed surrounding section of the fixing element, and the screw bolt is screwed with and unscrewed from the fixing element and the limiting element.

2. The saddle rear rack for the bicycle as claimed in claim 1, wherein the connector further includes a guiding groove arranged therein to slide the two hanging bars and includes a slot formed along the guiding groove; the connector further includes two screwing elements for screwing with and unscrewing from the two hanging bars via the slot.

3. The saddle rear rack for the bicycle as claimed in claim 1, wherein the body further includes an affixing rib arranged around an inner rim of a bottom end thereof.

4. The saddle rear rack for the bicycle as claimed in claim 1, wherein the body further includes two locking trenches defined on the two sides thereof.

* * * * *